April 5, 1966 C. G. ROBINSON ETAL 3,244,412
APPARATUS FOR MELTING MELTABLE MATERIALS
Filed Oct. 18, 1962 2 Sheets-Sheet 1
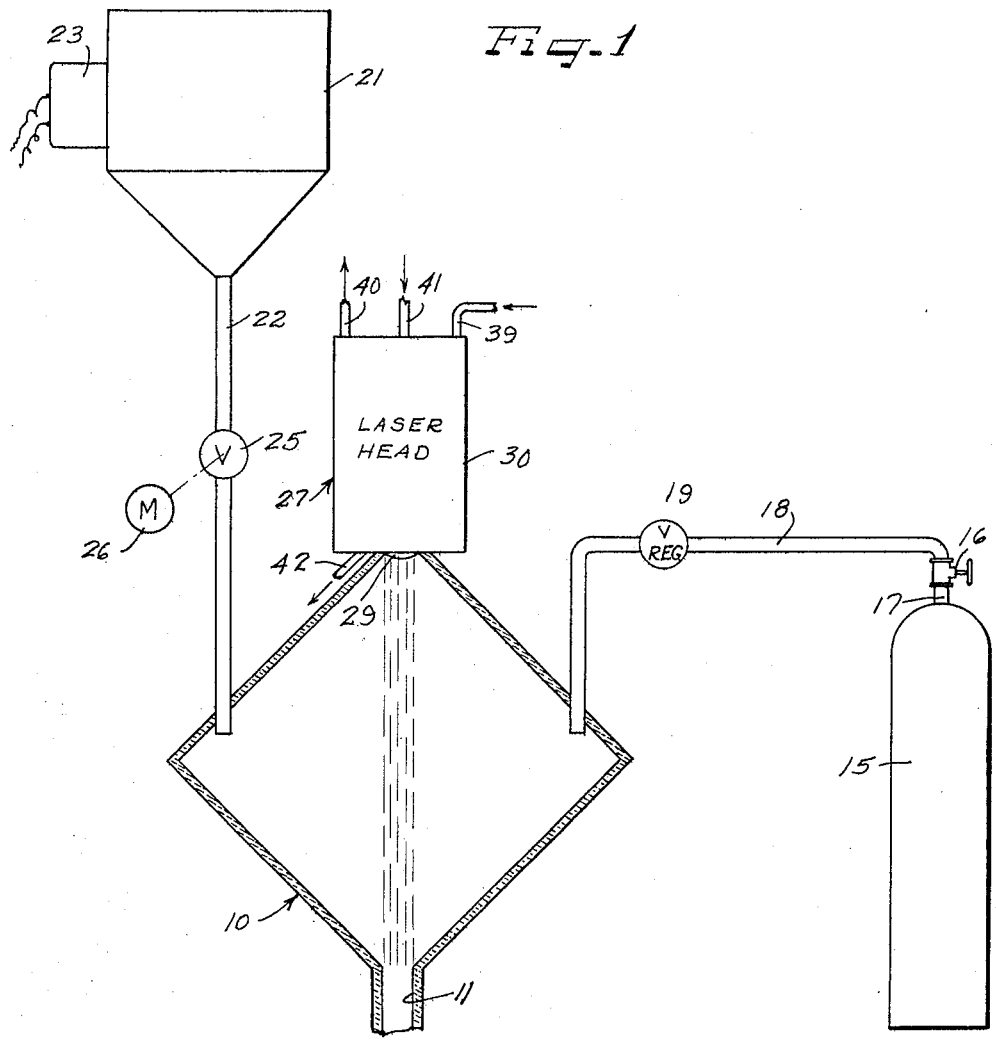
INVENTORS
Paul W. Dillon
BY Charles G. Robinson
ATTORNEYS

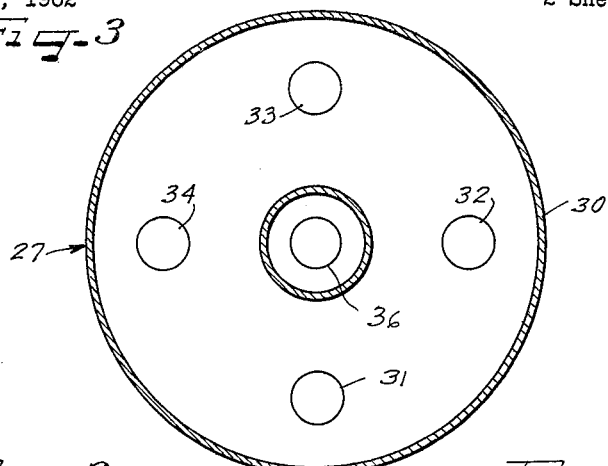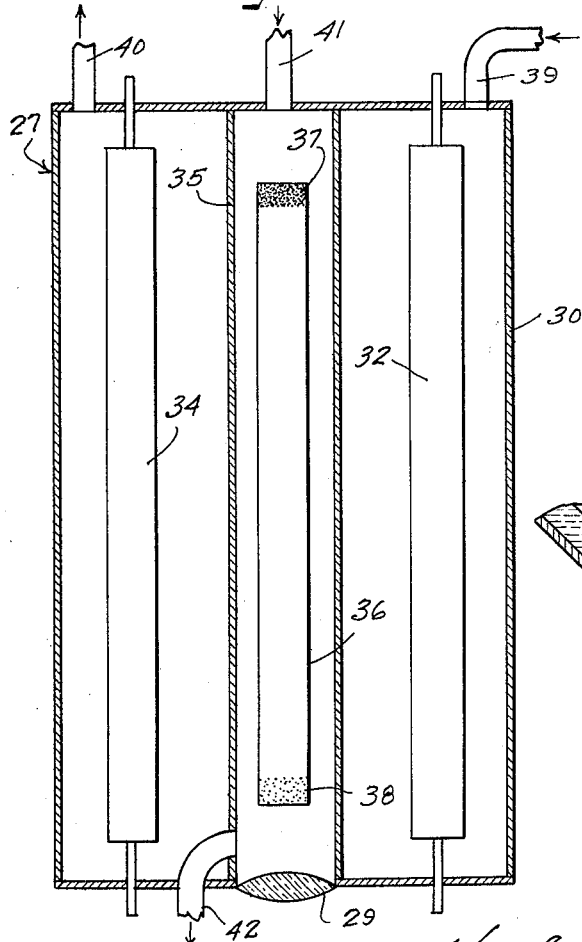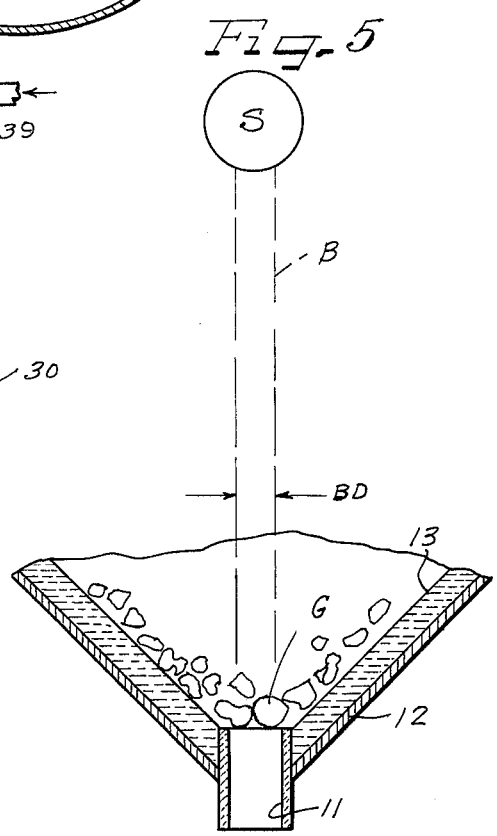
INVENTORS
Paul W. Dillon
Charles G. Robinson
ATTORNEYS United States Patent Office 3,244,412
Patented Apr. 5, 1966

3,244,412
APPARATUS FOR MELTING MELTABLE
MATERIALS
Charles G. Robinson and Paul W. Dillon, Sterling, Ill.,
assignors to Northwestern Steel & Wire Company, Sterling, Ill., a corporation of Illinois
Filed Oct. 18, 1962, Ser. No. 231,521
3 Claims. (Cl. 263—40)

This invention relates to an apparatus for applying heat to meltable materials and more particularly relates to an apparatus for melting metals and other materials by the use of optical heat in place of the usual electrodes or other conventional heating means.

The laser has been developed from the maser in recent years to provide a coherent light output operating in the light spectrum. The maser, of which the laser is an extension, operates in the microwave region.

The laser may be a solid state laser or may be a gaseous laser and has been the subject of considerable experimentation in the last two years, and has been found to have promise of adaptability not only in the optical and electronic fields, but also in the surgical and metal working fields.

A common solid state laser consists fundamentally of a cylinder of synthetic ruby, fully silvered at one end and partially silvered at the other end. The synthetic ruby which may be an aluminum oxide in which a small amount of chromium has replaced the aluminum, to absorb light at one frequency and emit light at another frequency or color, when excited by a light source, which may be a zenon filled flash tube. The flash tube when energized by a jolt of current sets off a brilliant flash of greenish light. The electrons of the ruby absorb the greenish light and generate energy at another frequency, or in other words the ruby absorbs the greenish light and gives off a pure red ray.

The process is much like normal fluorescence which takes place in fluorescent lighting in which ultraviolet light is used to excite the atoms of fluorescent material which give off white light. The separate quantities of light given off, however, are at random and the resultant light is incoherent.

The laser, however, generates a coherent signal, which means that all of the rays of the laser are at one frequency with all electromagnetic light radiation in phase in contrast to natural light or fluorescent lighting in which the rays are of many different frequencies and produce a hodge podge signal.

In a ruby laser composed of aluminum oxide and a small amount of chromium, the aluminum oxide transmits red and green light and is inert as to the fluorescent properties of the light. The chromium has three energy levels, including a normal state or low energy level and two higher energy levels. When chromium ions are in the normal state, they absorb green light. In doing this, they are excited to higher levels. These ions in the higher energy levels then give up their energy to the ruby lattice and fall to an intermediate or metastable state. The emission of photons by individual ions in the metastable state is sitmulated by other photons. The lowering of energy levels in this action permits the amplification as the returning lower energy ions from the chromium stimulate other excited chromium ions, thus emitting more photons to higher levers and producing a brillant flash of red light in photon retrogression. The red light is coherent and is of the same wave length as the photons, the emitted light being of one wave length of 6943 angstrom units.

A principal object of the invention is to utilize a light source formed on foregoing principles to form a source of melting materials in controlled melting processes.

Another object of the invention is to improve upon the melting of metals and other meltable materials by using an optical heat source for melting in place of the usual electrodes or other heating units.

A further object of the invention is to provide an improved apparatus for melting metallic and non-metallic materials, in which the material is placed in a confined vessel and subjected to an optical heat source.

A still further object of the invention is to improve upon the melting of meltable materials by applying heat to the meltable materials by optical methods.

Still another object of the invention is to provide an improved apparatus for melting meltable materials in which the material is melted in an enclosed melting vessel as it passes to an open bottom of the vessel, and in which an energy converting unit in the form of a laser power unit projects a coherent beam of light in the region of the outlet to melt the meltable material as it passes to the outlet.

These and other objects of the invention will appear from time to time as the following specification proceeds and with reference to the accompanying drawings wherein:

FIGURE 1 is a schematic view diagrammatically showing a form of melting and reducing apparatus constructed in accordance with the principles of the present invention;

FIGURE 2 is a sectional view taken through an energy converter and diagrammatically showing a form of a laser power unit which may be utilized to project a coherent beam of light into the melting vessel;

FIGURE 3 is a transverse sectional view taken through the laser power unit;

FIGURE 4 is a diagrammatic view of one of the lamps for exciting the laser tube and diagrammatically showing the focal angle of the lamp; and FIGURE 5 is an enlarged fragmentary diagrammatic view diagrammatically showing the focusing of the high energy of a coherent light beam on meltable material falling to the outlet from the melting vessel.

In the embodiment of the invention illustrated in the drawing, I have shown a melting vessel 10, which may be in the form of an invterted polygon having rectangular side walls with one corner of the polygon defining the bottom of the vessel, and having an outlet 11 leading from a lowermost corner of the vessel. The vessel may have a metal outer shell 12 having a refractory lining 13 as diagrammatically illustrated in FIGURE 5. The outlet 11 may be made of a graphite mold material.

The melting vessel 10 is supplied with an atmosphere controlling gas or gases, which may be in the form of reducing gases, and which are shown as being contained in a pressure vessel 15. A valve 16 connected to a pipe 17 leading from the pressure vessel is provided to shut off the flow of gases from said vessel when desired. A pipe 18 leads from the valve 16 into the vessel 10 through the wall thereof for supplying atmosphere controlling or reducing gases thereto. A pressure regulator valve 19 is provided in the pipe 18 to regulate the pressure of the gases supplied to the vessel 10.

A hopper 21 containing the meltable materials is shown as being spaced above the vessel 10 and as having connection at its lower end with a feeder pipe 22. A vibrator 23, which may be an electromagnetic vibrator is provided to facilitate the flow of meltable materials from the hopper 21. A proportioning valve 25 driven by a motor 26, is provided in the feeder pipe 22 to regulate the amount of meltable material entering the melting vessel 10.

An energy converter 27 in the form of a laser head is mounted on the top of the vessel 10 and has a lens 29 focusing the output of the laser head to the region of the outlet 11 leading from the vessel 10. The laser head may be a commercial form of laser head such as the laser heads developed by Hughes Aircraft, Quantatron, Inc. of California, Raytheon Company, Perkin-Elmer Corporation and Spectra-Physics, Inc.

The energy converter 27 is diagrammatically shown in FIGURES 2 and 3 as including an outer cylindrical shell 30 containing a series of equally spaced lamps 31, 32, 33 and 34 spaced radially outwardly from the center of the shell. The lamps 31, 32, 33 and 34 are located radially around a central tube 35, which may be made from transparent glass of a double walled construction with a vacuum between the walls, on the principles of a Dewar flask. Each lamp has a light angle marked A and diagrammatically shown in FIGURE 4 the light angles of the four tubes being such as to project light along the entire surface of a ruby rod 36 within the tube 35 and extending axially therealong. The lamps 31, 32, 33 and 34 may be of a gaseous discharge nature similar to photoflash tubes and emit an intense flash of light in the green part of the spectrum, which is focused through the tube 35 into the ruby rod 36, extending along said tube axially of the center thereof.

The ruby rod 36 may contain a synthetic ruby in the form of an aluminum oxide in which a small amount of chromium has replaced the aluminum. The end of the rod opposite the lens 29 is fully silvered to provide a fully silvered mirror 37. The opposite end 38 of the rod 36, adjacent the lens 29 may be partially silvered to form a partially silver mirror accommodating a coherent light beam to pass through the lens 29.

The lamps 31 to 34 may be cooled by air entering the shell 30 through an inlet air pipe 39 and leaving said shell through an outlet air pipe 40.

The ruby rod 36 may be cooled by liquid nitrogen entering the space between the tube 35 and ruby rod 36 through an inlet pipe 41 and leaving said space through an outlet pipe 42.

The liquid nitrogen is provided to keep the ruby rod 36 at temperatures in the region of minus 300° F. which temperatures may be of minus 321° F. to provide the proper cooling effect to increase the output of the ruby rod.

It should here be understood that while some laser crystals will work at room temperature these crystals exhibit more output for given input when cooled, and other crystals are not operable at room temperature and must be cooled to obtain laser action. When ruby crystals are kept at a temperature of minus 321° F., the output of the ruby rod will be doubled from the output of such a rod kept at normal temperatures.

The lights 31, 32, 33 and 34, focus white light in the green portion of the spectrum on the ruby rod 36, the green content of which excites the cromium electrons in the ruby rod. The electrons in the ruby absorbing this green light generate energy at another frequency or in other words give off a pure red ray. The red ray is focused to a common focal point through the lens 29, which focal point is an optical point, and can contain up to 100 million watts per square inch when the ruby rod is cooled to temperatures in the range of minus 321° F.

As for example, in FIGURE 5, a laser source is marked S. This laser source may be the converter 27 and focuses a beam B having a width BD on lump meltable stock G within the melting vessel 10. As the meltable stock melts over the orifice or outlet 11, the fluid will flow out through said outlet allowing more meltable material to slide down the inclined refractory sides of the vessel into the focal point of high energy.

It should here be noted that the width of the laser beam indicated by BD can be no larger than the internal diameter of the outlet 11. If it should be larger, the laser beam would melt out the orifice tube, which as previously mentioned, may be made from a graphite mold material.

It may here be seen that various materials may be melted by the laser beam ranging from the rare metals and exotic metals to the more common metals and ores in use at the present day, and that the beam may be employed to effectively melt the various meltable materials known at the present day.

It should further be understood that where iron ores are being melted, the pressure vessel 15 may supply the reducing gases necessary in the ore reducing process.

It may be seen from the foregoing that a simple apparatus has been provided for melting meltable materials and reducing ores, which makes it possible to melt meltable materials without the use of the usual heating elements or electrodes, and provides controlled melting by the use of a coherent light beam, and that this light beam is particularly applicable to the melting of rare and exotic metals, although it may be used for melting various forms of common ores.

While we have herein shown and described one form in which our invention may be embodied, it may readily be understood that various variations and modifications in the invention may be attained without departing from the spirit and scope of the novel concepts thereof.

We claim as our invention:

1. An apparatus for melting meltable materials comprising a melting vessel having sloping walls converging toward each other at the lower end portions thereof and having a melting and settling zone at the lower end portions of said walls, a feeder pipe for feeding a meltable material into said vessel to flow along the sloping walls thereof to said melting zone, an optical power converter at the top of said vessel including a laser head having a rod of laser material and at least one flashlight focusing of said rod, a lens in said vessel spaced from the end of said rod and focusing a beam of light emitted from said rod into a the melting zone, and a single outlet leading downwardly from said vessel in the focal area of the beam of light and of a greater cross-sectional area than the focal area of the beam of light.

2. An apparatus for reducing meltable materials comprising an enclosed vessel having sloping walls converging downwardly to a confined area at the lower end thereof, a single outlet leading downwardly from said confined area, a feeder pipe leading into said vessel, a hopper for containing the meltable material and having communication with said feeder pipe, proportioning valve means in said feeder pipe controlling the flow of meltable material into said vessel, a pressure vessel, a pipe leading from said pressure vessel into said melting vessel for supplying atmosphere controlling gases to said melting vessel, a lens at the top of said melting vessel in axial alignment with said outlet, an optical power converter mounted on top of said melting vessel on the outside thereof and on the outside of said lens, said optical power converter including a laser rod and at least one flashlight energizable to create a coherent beam of light in said rod projected through said lens and focused in direct alignment with said outlet, the beam of light having a lesser cross-sectional area than the cross-sectional area of said outlet.

3. An apparatus for melting meltable materials comprising, an enclosed melting vessel having inclined walls sloping to a common restricted melting area at the lower end portion of said vessel, a hopper disposed above said vessel, a feeder pipe leading from said hopper into said vessel into position to discharge meltable material into said vessel to flow downwardly along the sloping walls thereof, means for vibrating said hopper to flow the meltable material along said feeder pipe, a proportioning valve in said feeder pipe controlling the flow of meltable material along said pipe into said vessel, a pressure vessel, a communicating connection between said pressure vessel and the interior of said melting vessel for supplying gases thereto to control the atmosphere within said melting vessel, a lens at the top of said vessel and opening into said vessel in axial alignment with said melting area, an optical power converter mounted at the top of said melting vessel on the outside thereof and comprising a laser head having a laser rod above and in axial alignment with said lens and at least one flashing energizable to create a coherent beam of light in said rod focused by said lens into said common melting area, a single outlet leading downwardly from the bottom of said common melting area, said outlet being of greater cross-sectional area than the cross-sectional area of the beam of light and accommodating the material melted by the heat of the coherent beam of light to continuously flow through the bottom of said vessel by gravity.

References Cited by the Examiner

UNITED STATES PATENTS

| | | | |
|---|---|---|---|
| 683,089 | 9/1901 | Wideen | 75—68 |
| 2,756,044 | 7/1956 | Neumann | 266—335 |
| 2,935,395 | 5/1960 | Smith | 75—65 |
| 2,962,277 | 11/1960 | Morrill | 266—36 |
| 2,970,895 | 2/1961 | Clark et al. | 266—33 |
| 3,005,859 | 10/1961 | Candidus | 75—65 |

OTHER REFERENCES

American Machinist/Metalworking Manufacturing, Apr. 2, 1962, pages 76 and 77, July 25, 1960, page 85.

Electronics, Oct. 27, 1961, pages 39–47.

Engineers Digest, vol. 23, June 1962, pages 85 and 86.

Metalworking Production, vol. 106, May 23, 1962, pages 75 and 76.

DAVID L. RECK, *Primary Examiner.*

BENJAMIN HENKIN, *Examiner.*